(No Model.) 2 Sheets—Sheet 1.

J. B. ADT.
TOBACCO CUTTER.

No. 605,371. Patented June 7, 1898.

WITNESSES
Dan'l Fisher
H. Constantine

INVENTOR
John B. Adt,
by G. H. W. T. Howard,
atty.

(No Model.) 2 Sheets—Sheet 2.
J. B. ADT.
TOBACCO CUTTER.
No. 605,371. Patented June 7, 1898.
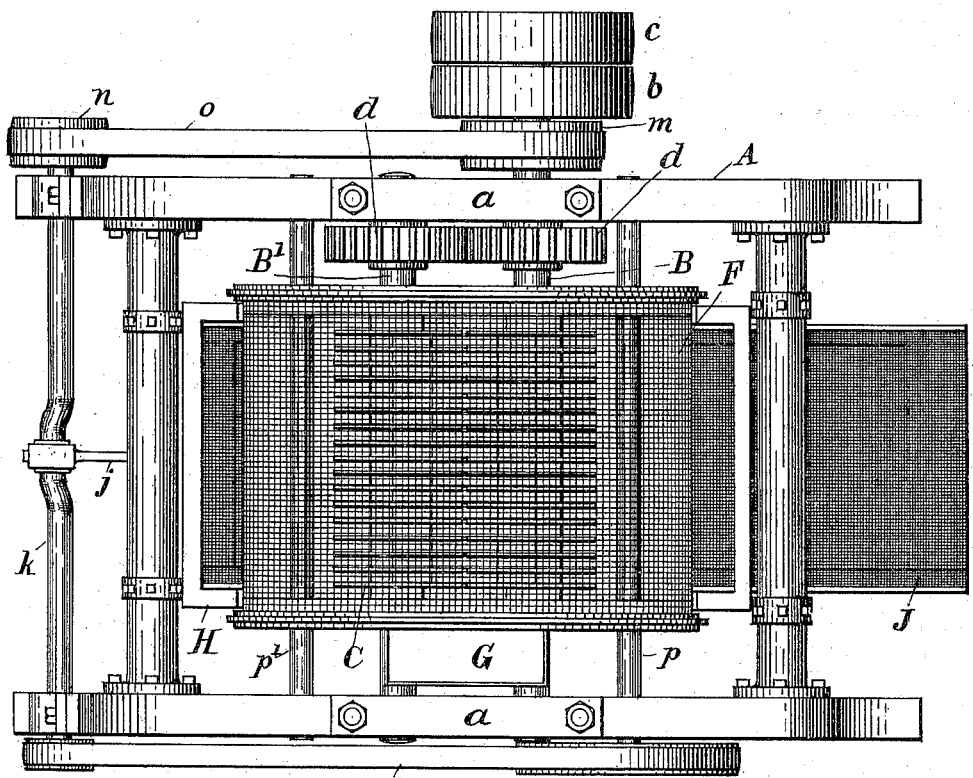
Fig. 2.
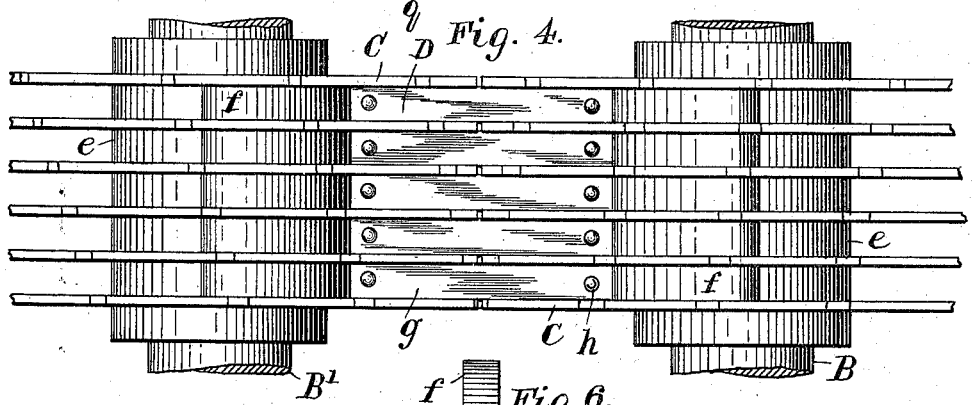
Fig. 4.
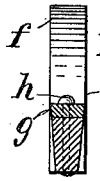
Fig. 6.
Fig. 5.
WITNESSES
Dan'l Fisher
H. Constantine
INVENTOR
John B. Adt
by W. T. Howard
atty.

UNITED STATES PATENT OFFICE.

JOHN B. ADT, OF BALTIMORE, MARYLAND.

TOBACCO-CUTTER.

SPECIFICATION forming part of Letters Patent No. 605,371, dated June 7, 1898.

Application filed October 11, 1897. Serial No. 654,778. (No model.)

*To all whom it may concern:*

Be it known that I, JOHN B. ADT, of the city of Baltimore, State of Maryland, have invented certain Improvements in Tobacco-Cutters, of which the following is a specification.

This invention relates to certain improvements in the invention described in Letters Patent No. 400,723, granted to me on the 2d day of April, 1889, for certain improvements in a tobacco-cutter, to which reference should be made. In the said patented invention I employ as cutting devices rotary toothed disks or saws in connection with a comb, between the teeth of which the disks or saws extend, the disks and the teeth of the comb forming the two cutting edges, which coöperate after the manner of the blades of shears.

The present invention consists in substituting for the comb shown and described in the said Letters Patent removable independent bridge-pieces, the ends of which are supported by the spacing-collars between the saws, the edges of the said bridge-pieces coöperating with the edges of the saws to form cutters, as will hereinafter fully appear.

In the further description of the said invention which follows reference is made to the accompanying drawings, forming a part thereof, and in which—

Figure 1:
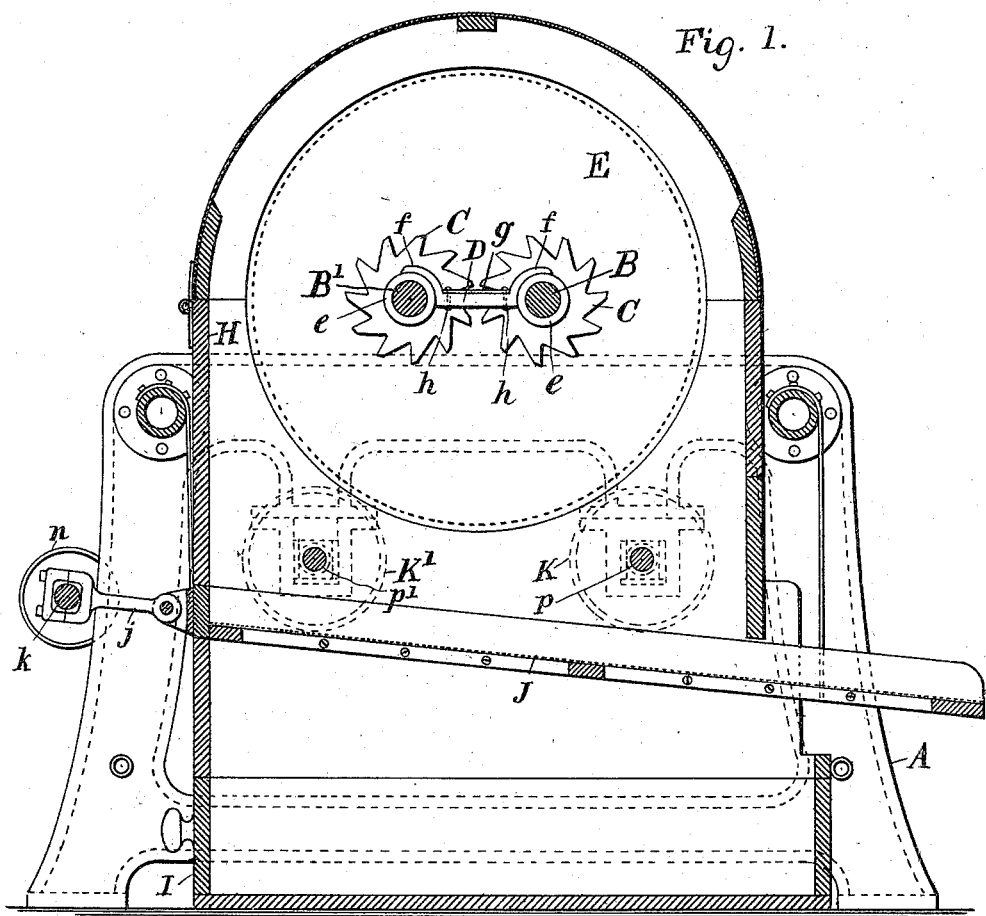
Figure 3:
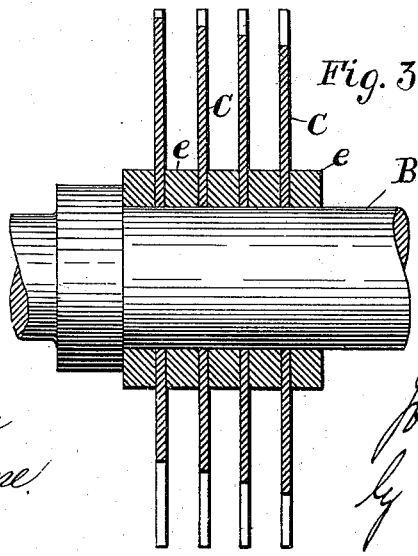

Figure 1 is a vertical section of the improved tobacco-cutter. Fig. 2 is a top view of the same with the upper part of the outer casing removed. Figs. 3, 4, 5, and 6 are enlarged details of the machine.

Referring now to the drawings, A is the frame of the machine.

B B' are shafts resting and adapted to be turned in suitable bearing-boxes $a$. The shaft B is the driving-shaft and is for that purpose provided with a tight and a loose driving-pulley, respectively denoted by $b$ and $c$. The other shaft B' is driven from the driving-shaft B by means of the spur gear-wheels $d$.

C C are toothed disks or saws on the shafts B B', separated by spacing-collars $e$, and they, together with the spacing-collars, are clamped by means of nuts (not shown) in a manner substantially the same as that shown and described in the said Letters Patent. The saws are set on the shafts so that their teeth are not in alinement with the shafts, they forming a spiral around the shafts, as shown and described in the said Letters Patent.

D D are bridge cutters (shown on an enlarged scale in Figs. 4, 5, and 6) which, in connection with the saws, form the cutting devices of the machine. The width of these bridge cutters at their upper surface corresponds with the distance between the saws, and they are tapered slightly, as seen in cross-section, to give clearance below the cutting edges. The bridge cutters are provided with curved ends $f$, which rest on the collars $e$, between the saws, and are held in place by their own weight. They may be made of steel, and thereby furnish their own cutting edges; but it is preferred to make them of brass or iron and secure to their upper surfaces steel plates $g$, the sides of which furnish the cutting edges, as shown in Figs. 4, 5, and 6, in which the steel plates are shown as held to the cutters proper by rivets $h$. The advantage of this improved construction is that the bridge cutters when their edges become worn may be easily removed and others substituted therefor.

E E are annular heads supported by the shafts B B', and around these is revolved the cylindrical sieve F; but these, together with all the mechanism hereinafter described, form no part of the present invention.

G is a hopper into which the tobacco to be cut is introduced.

H is a casing which surrounds the sieve, the top of which is hinged to the remaining portion and answers the purpose of a door to be opened to give access to the sieve. In the lower part of the casing is a drawer I.

J is a wire-cloth screen shaken by means of a link $j$, connected to a crank-shaft $k$, driven from the shaft B by means of the pulleys $m$ and $n$ and the belt $o$.

The cylindrical sieve F is supported by the rollers K and K' on shafts $p$ and $p'$, the one $p$ being driven by a belt $q$ from the crank-shaft $k$.

The tobacco introduced into the sieve through the hopper in the rotation of the former is carried upward and falls on and passes through the cutters, and that portion of it which is reduced to the proper size, together with the dust, passes through the sieve and falls onto the shaking-screen, from which the coarser particles are delivered to any receptacle placed exteriorly of the machine to receive it. The dust passes through the screen to the drawer I. The particles of tobacco which are too large to pass through the sieve are again carried up by the sieve and again fall on the cutters and another portion of them reduced in size, the operation being a continuous one.

I claim as my invention—

In a tobacco-cutter, the combination of a revoluble sieve, a pair of revoluble shafts within the sieve, saws on the said shafts, spacing-collars between the saws, and removable bridge cutters of a width corresponding with that of the spacing-collars situated between the saws with their ends resting on and supported by the said spacing-collars, substantially as specified.

JOHN B. ADT.

Witnesses:
 DANL. FISHER,
 WM. T. HOWARD.